United States Patent [19]

Sako et al.

[11] Patent Number: 5,077,721
[45] Date of Patent: Dec. 31, 1991

[54] DATA RECORDING AND/OR REPRODUCING METHOD AND DATA RECORDING MEDIUM

[75] Inventors: Yoichiro Sako, Chiba; Hiroshi Ogawa, Kanagawa, both of Japan

[73] Assignee: Sony Corporation, Tokyo, Japan

[21] Appl. No.: 369,312

[22] Filed: Jun. 21, 1989

[30] Foreign Application Priority Data

Jun. 23, 1988 [JP] Japan .................. 63-153641

[51] Int. Cl.$^5$ .................. G11B 7/00; G11B 5/09; H04B 14/04; H04L 27/00
[52] U.S. Cl. .................. 369/59; 369/32; 375/25; 375/37; 360/40
[58] Field of Search .................. 369/59, 32; 360/40; 375/37; 341/58, 63, 93

[56] References Cited

U.S. PATENT DOCUMENTS

| | | | |
|---|---|---|---|
| 4,501,000 | 2/1985 | Immink et al. | 341/58 |
| 4,539,691 | 9/1985 | Ogawa et al | H04L/300 |
| 4,626,826 | 12/1986 | Fukuda et al. | 360/40 |
| 4,731,678 | 3/1988 | Takeuchi | 360/40 |
| 4,833,471 | 3/1989 | Tokuume et al. | 341/63 |

Primary Examiner—Roy N. Envall, Jr.
Assistant Examiner—Nabil Hindi
Attorney, Agent, or Firm—Philip M. Shaw, Jr.

[57] ABSTRACT

The present invention is concerned with a method for modulating and recording data, in which the data are modulated in such a manner that m-bit data are converted into n-bit data, where m and n are real integers and m<n, p-bit merging bits are inserted between the n-bit data and the number of consecutive "0"s in the alternate concatenation of these n-bit data and p-bit merging bits is not less than a predetermined number d and not more than a number k which is larger than d, wherein the merging bits of the bit pattern consistent with a digital sum value of recording data are inserted between the n-bit data and the DSV is reset at each data block as one unit to facilitate data control for each data block as a unit. The present invention also provides a data recording medium on which are recorded data following this method. When the recording data are demodulated and reproduced from the recording medium, it is decided whether the bit pattern of the above merging bit is consistent with the modulation rule and the error detection data which deem the reproduced data in the vicinity of the merging bits not consistent with the modulation rule as being in error are outputted along with the reproduced data to improve the reliability of the reproduced data produced in the reproducing system.

13 Claims, 8 Drawing Sheets

DATA RECORDING AND/OR REPRODUCING METHOD AND DATA RECORDING MEDIUM

BACKGROUND OF ART

1. Field of the Invention

This invention relates to a data recording and/or reproducing method as well as a data recording medium. More particularly, it relates to a method for modulating and recording digital signals, a method for reproducing recorded signals and a recording medium on which the digital signals are recorded.

2. Prior Art

There are a variety of different types of apparatus for recording and reproducing data on a recording medium, operating on various recording/reproducing principles or utilizing recording media having various outer shapes.

In general, data recording media can be classified according to the operating principle, such as the magnetic and/or optical recording/reproducing principle, and also according to the outer shape, such as tape, card, or disc shaped recording media.

For example, there are disc players dedicated to reproduction, such as CD players for reproducing a so-called compact disc (CD) on which audio signals such as voice or musical sound are previously recorded in a digitized form.

Figure 1:
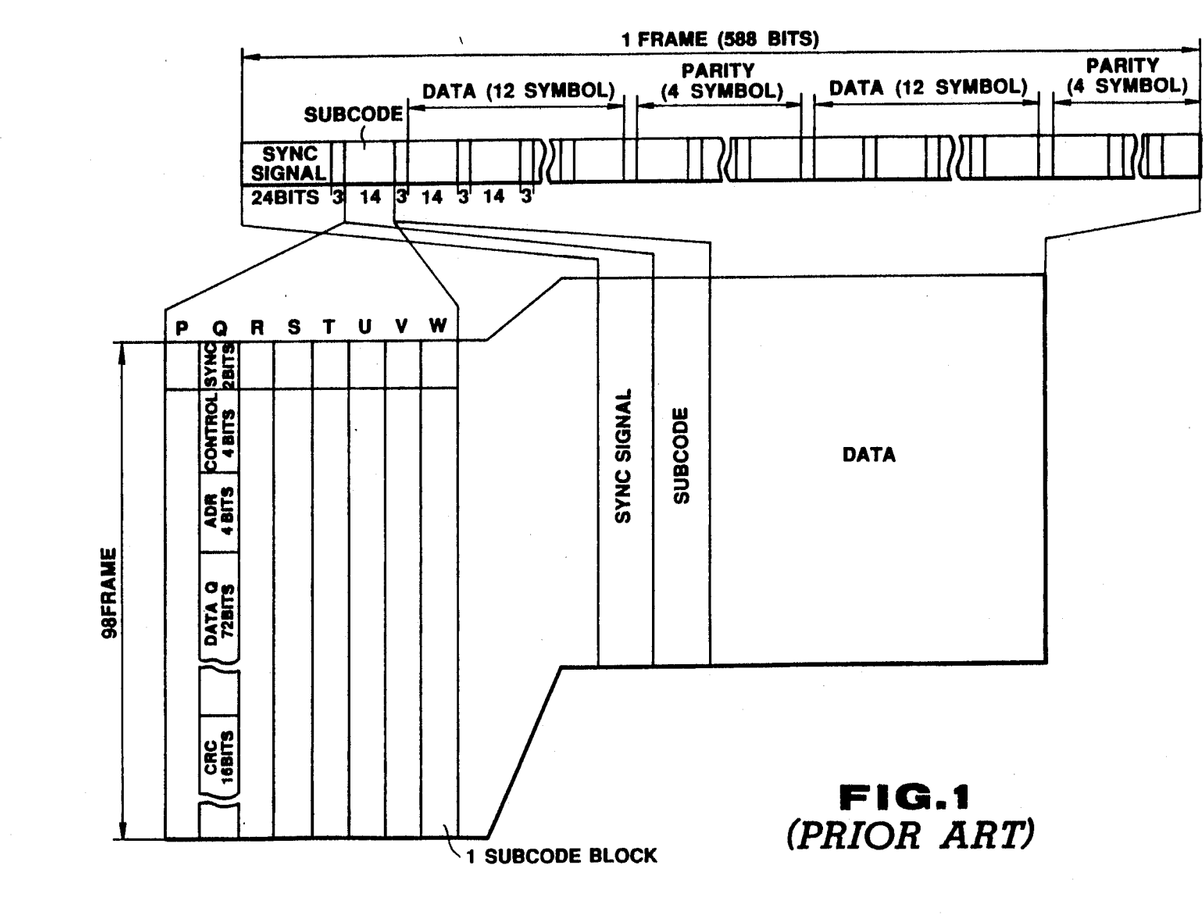
FIG. 1 is a diagrammatic view showing the data format of a compact disc (CD)

In a compact disc (CD), as shown in FIG. 1, a data format having 98 frames as one subcode block is standardized, wherein each frame is constituted by a 24-bit sync signal, supplied as eight to fourteen modulation data, in which 1-symbol/8-bit signals are converted into data of 14 bits (L channel bit) constituting 1 symbol of subcode, i.e. one symbol being composed of 14 bits, 32 symbols of data, such as two sets of 12 symbols of play data and 4 symbols of parity bits, with each symbol being composed of 14×32 bits, and with three merging bits between the adjacent symbols. Thus each frame includes the sum total of 588 bits. The absolute address of each subcode block is given by the Q-channel signals of the above subcode and the data such as the play data are processed at intervals of one subcode block.

In the EFM in the above described compact disc (CD), modulation is so made that the number of the consecutive "0" bits in a concatenation of the 14 bit or 1 symbol data and 3 merging bits is not less than 2 and not more than 10. On the other hand, the digital sum value (DSV) is counted continuously from the start position of the recording data and the merging bits of the bit pattern according to or consistent with this DSV value are given to control the above DSV.

A similar technique is disclosed in, for example, the U.S. Pat. No. 4,539,691 owned by the present Assignee.

Figure 2:
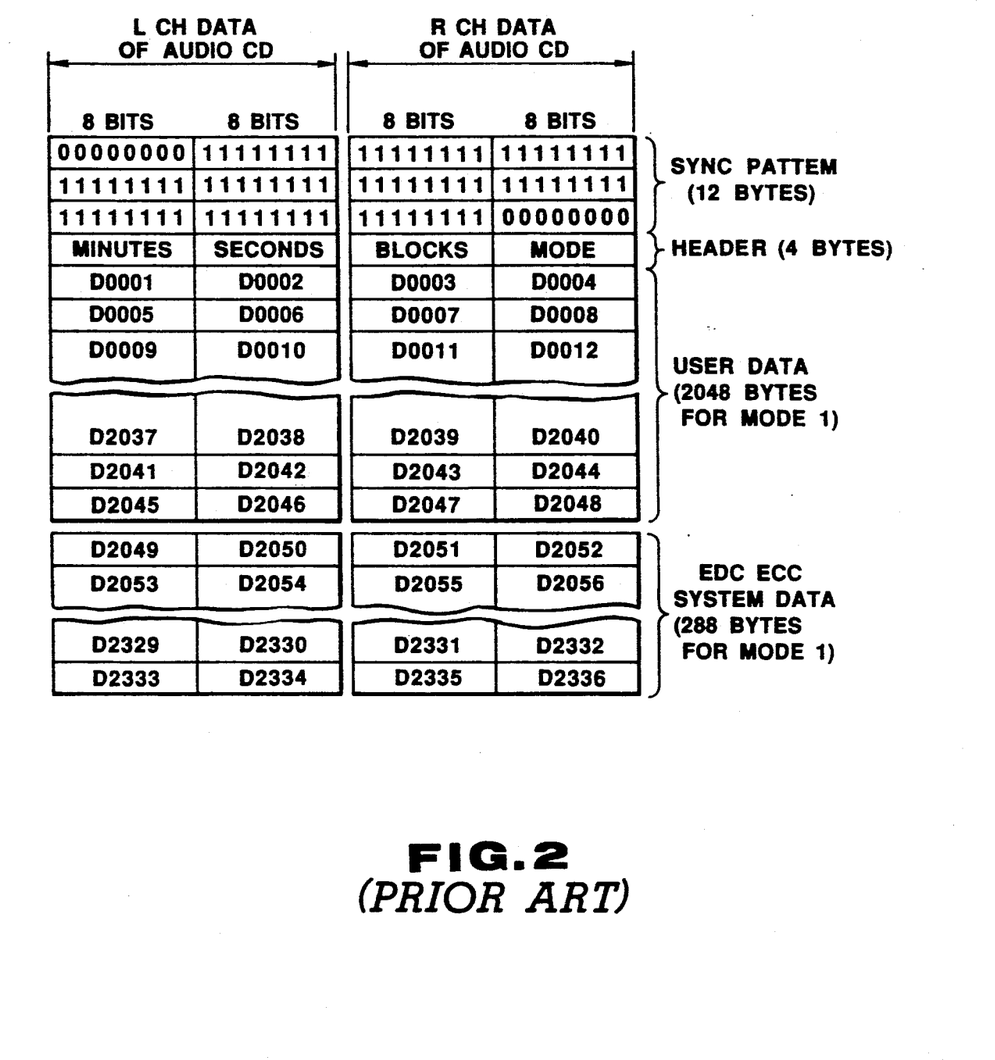
FIG. 2 is a diagrammatic view showing the data format of a CD-ROM.

In CD-ROMs, as shown in FIG. 2, wherein the left and right channel digital audio signals recorded on the compact disc (CD) are alternately connected at intervals of one word (2 symbols = 16 bits) so as to be treated as one channel of serial data and the CD is treated as a data storage device, a header section and sync signals are annexed ahead of each subcode block or 98-frames of data in the CD data format, such that each sector or block is constituted by 2 K bytes of data.

Since the conventional CD player is dedicated to reproduction, attempts have been made to develop a data storage medium and a recording and/or reproducing system making use of the data storage medium, such as a so called "write once compact disc" (referred to as a "CD-WO") or an erasable compact disc (referred to as "CD-erasable") or "CD-RAM". This CD-WO or CD-erasable makes use of a magneto-optical disc which is formed by a rewritable magneto-optical recording medium and which is interchangeable with respect to the CD or CD-erasable, as disclosed in our co-pending U.S. patent application Ser. No. 102,009 filed on Sept. 28, 1987.

In the CD data format, as described hereinabove, the DSV is counted continuously from the start position of the recording data, and the merging bits of the bit pattern consistent with the DSV value are afforded to control the DSV, so that data writing or rewriting cannot be made. On the other hand, in data storage such as CD-WO or CD-RAM, it is necessary to control the data efficiently.

OBJECTS AND SUMMARY OF THE INVENTION

It is an object of the present invention to provide a method for modulating and recording data, in which the data are modulated in such a manner that m-bit data are converted into n-bit data, where m and n are real integers and m<n, p-bit merging bits are inserted between the n-bit data and the number of consecutive "0"s in the alternate concatenation of these n-bit data and p-bit merging bits is not less than a predetermined number d and not more than a number k which is larger than d, wherein the read-out error of the data reproduced from the recording medium is detected by taking advantage of the above merging bits to improve the reliability of the reproduced data.

It is another object of the present invention to provide a data recording medium, such as CD-WO or CD-RAM, designed to be able to control the data on a block-by-block basis.

It is yet another object of the present invention to provide a method in such a manner that m-bit data are converted into n-bit data, where m and n are real integers and m<n, p-bit merging bits are inserted between the n-bit data and the number of consecutive "0"s in the alternate concatenation of these n-bit data and p-bit merging bits is not less than a predetermined number d and not more than a number k which is larger than d, the method comprising deciding whether the bit pattern of the merging bits is consistent with the modulation rule and outputting error detection data deeming the reproduced data in the vicinity of the merging bits not consistent with the modulation rule to be in error along with the reproduced data.

The above and other objects and novel features of the present invention will become apparent from the following description especially when read in conjunction with the accompanying drawings.

DESCRIPTION OF PREFERRED EMBODIMENTS

By referring to the drawings, an illustrative embodiment of the present invention will be explained in more detail.

In the embodiment which will be explained hereinbelow, the present invention is applied to a recording/reproducing system for an optical disc.

Figure 3:
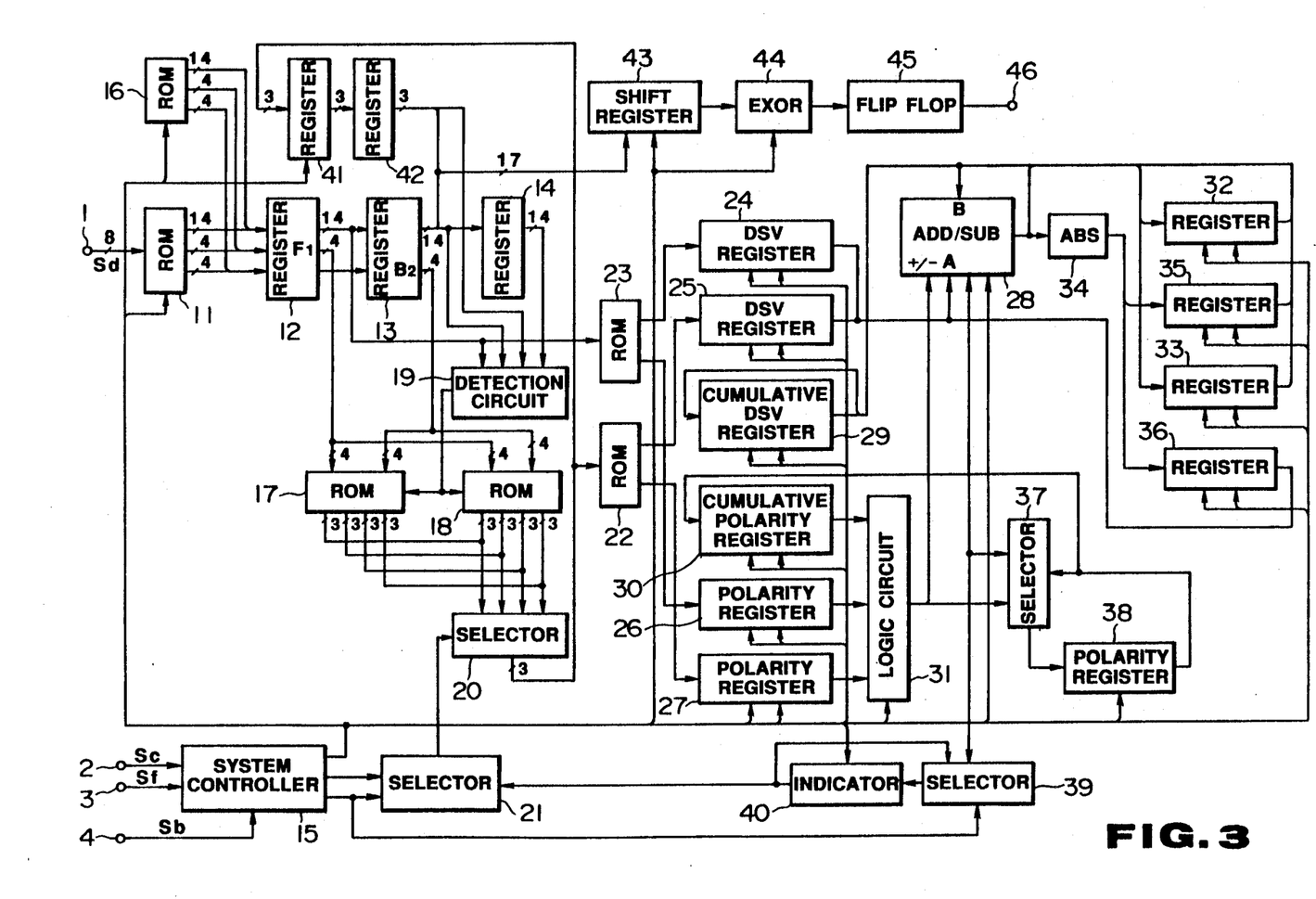
FIG. 3 is a block diagram showing a modulating circuit constituting the recording system of the recording/reproducing apparatus for an optical disc to which the present invention is applied.
Figure 4A:
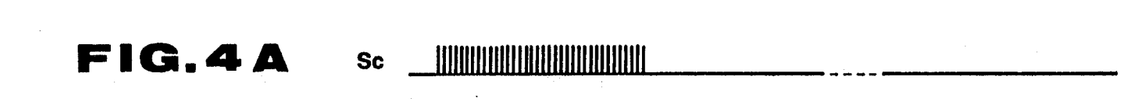
FIGS. 4A, 4B, 4C and 4D are diagrammatic views showing the relation among the signals in the modulating circuit shown in FIG. 3.
Figure 4B:
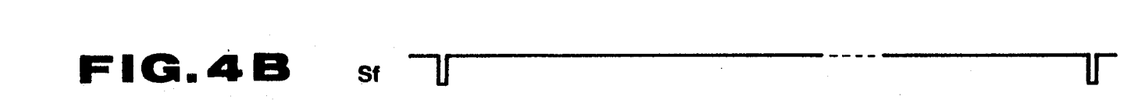

Referring to the block diagram of FIG. 3 showing a modulating circuit of the recording system of the present embodiment, the numeral 1 denotes a data input terminal to which a data signal Sd formed by eight parallel bits is supplied from a CIRC encoder, not shown, and the numeral 2 a clock input terminal to which 4.3218 MHz system clock signals Sc, as shown in FIG. 4A, are supplied. The numerals 3 and 4 denote sync input terminals to which 7.35 kHz frame sync signals Sf and a subcode block, that is, block sync signals Sb at interval of 98 frames, as shown in FIG. 4, are supplied, respectively.

Figure 4C:
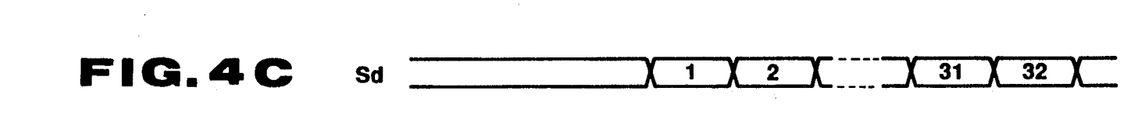
Figure 4D:
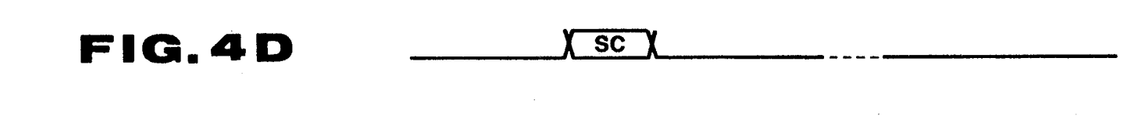

Between the adjacent frame sync signals Sf, 32 data signals Sd formed by 8 parallel bits of CIRC encoded voice signals as shown in FIG. 4C and subcode signals SC formed by 8 parallel bits as shown in FIG. 4D, are formed. These data signals Sd and subcode signals SC are selected at a predetermined timing by a selector, not shown, so as to be supplied to the data input terminal 1.

The data signals Sd are supplied from the data input terminal 1 to a read-only memory 11 where the 8-bit data signals are converted into 14-bit data in accordance with a predetermined conversion table. The 14-bit data signals thus produced by conversion at the read-only memory 11 are sequentially transmitted to registers 12, 13 and 14.

The system clock signal Sc, frame sync signal Sf and the block sync signal Sb are supplied to a system control circuit 15 via input terminals 2, 3 and 4, respectively. Based on the system clock signals Sc, frame sync signals Sf and the block sync signals Sb, the system control circuit 15 controls the operation of each circuit block with 98 frames or 1 sub-block as one unit.

In the CD data format, the sync pattern in the data signals is formed by 24 bits of (100000000001000000000010). In the present embodiment, since the registers 12, 13 and 14 are designed to handle 14-bit data, the pattern in replaced by a 14-bit pattern of (10000000000100) which is restored at the output stage into a 24-bit sync pattern. The above 14-bit pattern data are supplied to the registers 12, 13 and 14 after being formed at a read-only memory 16 by signals from the control circuit 15 responsive to the frame sync signals Sf. In addition, in the above described subcode signals, pattern data of $S_0=(00100000000001)$ and $S_1=(00000000010010)$ are inserted at intervals of one subcode block or 98 frames. These signals $S_0$ and $S_1$ are formed at the read-only memory 16 by signals from the control circuit 15 responsive to the block sync signals Sb so as to be supplied to the registers 12, 13 and 14.

These signals are sequentially transferred through the registers 12, 13 and 14 in the sequence such that the data previously stored in the register 12 are next stored in the register 13 and the data previously stored in the register 13 are next stored in the register 14.

Also, the number of the leading "0"s and that of the terminal "0"s of the 14-bit data formed in the read-only memories 11 and 16 are primarily determined by the data signal Sd, so that these numbers are formed simultaneously as the data signals. The numbers of the leading and terminal "0"s of the 14-bit data are set so as to be not more than 9 in the conversion table, and are represented by four bits. The number of the terminal "0"s in the 14-bit substitution data in the sync pattern is two, while that in the 24-bit pattern is one so that the number of terminal "0"s in this case is set to one (0001). These 4-bit signals are transferred through the registers 12, 13 and 14, similarly to the data signals.

The numeral $F_1$ indicating the number of the leading "0"s of the register 12 and the numeral $B_2$ indicating the terminal "0"s of the register 13 are supplied as addresses to the read-only memories 17, 18 to form the three merging bits.

In the above read-only memories 17 and 18, four bit patterns (000), (001), (010) and (100) are selected for the merging bits which will satisfy the above described rule that the number of consecutive "0"s should be not less than 2. The merging bits should also satisfy the rule that the number of consecutive "0"s should be not less than 2 and not more than 10 in the state in which the merging bits are inserted between the leading and trailing data signals. Thus, using the above numerals $F_1$ and $B_2$ as the addresses, the bit patterns are selected to the exclusion of the combinations not satisfying the above rule. In addition, in order that the merging bits when inserted between the leading and trailing data signals will not be coincident with the above described 24-bit sync pattern, the merging bit combination marked X are excluded when the leading and trailing data signal patterns are one of the following eleven combinations (It will be noted that the totality of the case of the merging bits selected by the above numerals $f_1$ and $B_2$ are shown).

| merging bits | sync pattern | |
|---|---|---|
| ... 10000000( )10000000000100000000010 ... | | (1) |
| (1 0 0) | | |

| sync pattern | merging bits | |
|---|---|---|
| ... 10000000000100000000010( )0000001 ... | | (2) |
| | (0 1 0) | |
| | (0 0 1) | |

| merging bits | | |
|---|---|---|
| ... 0010000000( )10000000000100 ... | | (3) |
| (1 0 0) | | |

-continued merging bits (4)

...0000000000100( D⊗C )00000100...
(0 0 1)
(0 1 0)
(1 0 0)

merging bits (5)

...001000000( 0 0 0 )01000000000010...
(1 0 0)
(0 1 0)

merging bits (6)

...01000000000010( D⊗C )000000100...
(0 1 0)
(0 0 1)

merging bits (7)

...00100000000001( D⊗C )0000000100...
(0 0 1)

merging bits   merging bits (8)

...0010( 0 0 0 )00000001000000( D⊗C )010...
(1 0 0)
(0 1 0)

merging bits   merging bits (9)

...0010( 0 0 0 )00000010000000( D⊗C )10...
(1 0 0)

merging bits   merging bits (10)

...00( 1 0 0 )00000000100000( D⊗C )0010...
(1 0 0)
(0 1 0)
(0 0 1)

merging bits   merging bits (11)

...00100( 0 0 0 )00000100000000( D⊗C )0...
(1 0 0)

The above 11 bit patterns can be discriminated by the current data, preceding data, further preceding data, and a preceding merging bit. In the present embodiment, all the merging bits with respect to the numbers $F_1$ and $B_2$ are outputted from the read-only memory 17, while the merging bits are outputted form the read-only memory 18 to the exclusion of the combinations marked X with respect to the numerals $F_1$ and $B_2$ in the above 11 combinations. In addition, the data signals held in the registers 12, 13 and 14 and the preceding merging bit held in a register 42 as later described are supplied to a detection circuit 19 where the above described 11 combinations are detected. By the detection signals from the detection circuit 19, the read-only memory 17 is usually selected and the read-only memory 18 is selected for the above 11 combinations.

In the present embodiment, the merging bits outputted from the read-only memories 17 and 18 are supplied to a selector 20. The numerals of 0 to 3 are sequentially supplied to a selector 21 from the system control circuit 15. This selector 21 initially selects system control circuit 15, to transmit the numerals of 0 to 3 from the system control circuit 15 to the selector 20. This causes the selector 20 to select the input, that is, merging bits, as a function of the numerals 0 to 3 from the system control circuit 15.

The merging bits selected by the selector 20 are supplied to the address input of a read-only memory 22 where the polarity signal and the digital sum value (DSV) signal of the digital signal constituting the merging bits are formed. On the other hand, the data signals of the register 12 are supplied to the address input of a read-only memory 23, where the polarity signal and the digital sum variation (DSV) signal of the digital signals constituting the data signals are formed. The signals indicating the polarity and DSV of the data signals and the merging bits are supplied respectively to DSV registers 24, 25 and polarity registers 26, 27.

The signals from the DSV registers 24, 25 are supplied to one input A of an adder/subtractor 28. The output signals from a cumulative DSV register 29 are supplied to the other input B of the adder/subtractor 28. The signals from the polarity registers 26, 27 and the signal from the cumulative polarity register 30 are supplied to a logic circuit 31, the output of which controls the addition and subtraction of the adder/subtractor 28.

The output signals of the adder/subtractor 28 are supplied to registers 32, 33, while being simultaneously supplied via an absolute value circuit 34 to registers 35, 36. The output signal of the register 36 is supplied to the input A of the adder/subtractor 28. Further, the output signals of the registers 32, 33 and 35 are supplied to the other input B of the adder/subtractor 28, while being simultaneously supplied to the DSV register 29.

An output signal from the logic circuit 31 is supplied to a selector 37. The output signal from a polarity register 38 is supplied as an input to the selector 37 and the cumulative polarity register 30. The selector 37 is also controlled by the signals from the adder/subtractor 28. The output signal from the selector 37 is supplied to the input of the polarity register 38.

The numeral data supplied from the system control circuit 15 is also supplied to the selector 39. The selector 39 is controlled by the signals from the adder/subtractor 28 and the output signal from the selector 39 is supplied to the input of the indicator circuit 40. The output signal from the indicator 40, which represents the optimum merging bits, is supplied to the selector 21 and to the selector 20.

The above circuitry is controlled by the signals from the system control circuit 15 to eliminate the combination that can not be allowed under the rule of the CD data format as well as to select the merging bits in the optimum combinatorial status to suppress the DC components.

Figure 5:
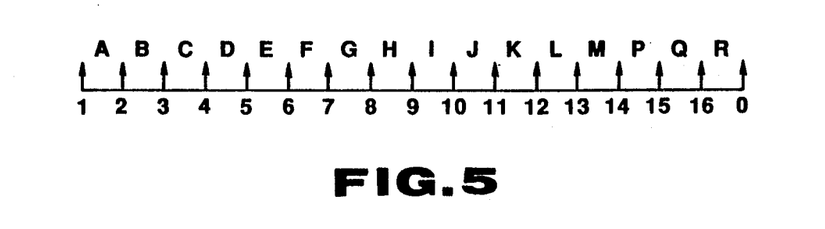
FIG. 5 is a time chart for illustrating the operation of the modulating circuit.

It will be noted that, for serially outputting a set of signals consisting of 14-bit data signals and 3 merging bits, $14+3=17$ clock periods are necessitated. For parallel processing of the above data, the processing is performed at the timings of 0 to 16 using 17 time slots of A to R as shown in FIG. 5 and the new 14-bit pattern is introduced at the next timing 0.

Thus, first of all, a supplied 14-bit data is set in the register 12 at the timing 0. At the time interval A, each of the read-only memories 17, 18, 20 and 23 is accessed, while the read-only memory 22 is accessed by the first merging bit selected by the selector 20.

Next, at timing 1, the data signal from the read-only memories 22 and 23, DSV and the polarity of the first merging bit are set in the registers 24, 25, 26 and 27, respectively. Then, during time interval B, the outputs of the registers 25 and 29 are selected and supplied to the adder/subtractor 28, the polarity of the register 30 is taken out directly at the logic circuit 31 and transmitted to the adder/subtractor 28. For negative polarity ("0") and positive polarity ("1"), addition (A+B) and subtraction (A−B) are performed, respectively.

The result of the arithmetic operation at the adder/subtractor 28 is set at the timing 2 in the register 32, while the absolute value of this set value is set in the register 35. During the time interval C, the outputs of the registers 32, 24 are selected and supplied to the B and A inputs, respectively, of the adder/subtractor 28, while an exclusive OR of the outputs of the registers 30, 27 is taken at the output of the logic circuit 31 to control the adder/subtractor 28 by the polarity of the exclusive OR output.

The result of the arithmetic operation at the adder/subtractor 28 and the absolute value circuit 34 are set at the timing 3 in the registers 32, 35, respectively. The exclusive OR of the above mentioned exclusive OR output from the logic circuit 31 and the contents of the register 26 is taken from the output of the logic circuit 31 and set in the register 38, and the indicator 40 is set at "0" at the timing 3.

During this time interval C, the second merging bit is selected at the selector 20, while the output of the read-only memory 22 is set at the timing 3 in the registers 25, 26. During the time interval D, the outputs of the registers 25, 29 are set in the adder/subtractor 28 and the arithmetic operation is performed in the adder/subtractor 28 as a function of the polarity of the register 30.

The result of the arithmetic operation by the adder/subtractor 28 and the absolute value are set at the timing 4 in the registers 33, 36. During the time interval E, the outputs of the registers 33, 24 are set in the adder/subtractor 28, and the arithmetic operation according to the polarity of the exclusive OR of the registers 30 and 26 is carried out in the adder/subtractor 28.

The result of the arithmetic operation in the adder/subtractor 28 and the absolute value are set at timing 5 in the registers 33 and 36. During the time interval F, the outputs of the registers 35 and 36 are set in the adder/subtractor 28 and the arithmetic operation (B-A) is carried out at the adder/subtractor 28.

At timing 6, should the result of the arithmetic operation at the adder/subtractor 28 be positive, the absolute value of the contents of the register 32 is larger than the absolute value of the contents of the register 33. Thus, the contents of the register 33 are transferred to the register 32, at the same time that the exclusive OR of the contents of the register 27 and the exclusive OR output of the registers 30 and 26 is taken out and set in the register 38, while "1" is set in the indicator 40.

During this time interval F, the third merging bit is selected at the selector 20, while the output of the read-only memory 22 is set at the timing 6 in the registers 25 and 26.

By a similar sequence of operations, the arithmetic operation with respect to the third merging bits is performed during the periods (G) to (I) and the result of the operation is set at the timing 9 in the indicator 40.

The fourth merging bit is set at the timing 9, the arithmetic operation for this merging bit is carried out during the time intervals (J) to (L) and the result of the operation is set at the timing 12 in the indicator 40.

During the time interval M, the selector 21 is switched to the indicator 40, the selector 20 is switched by the contents of this indicator 40 and the optimum merging bit selected at the timing 13 is supplied to a register 41. At this time, since the contents of the registers 32, 38 are of the cumulative DSV and polarity corresponding to the aforementioned optimum merging bit, these values are set in the above registers 29 and 30.

The contents of the register 41 are transferred at the next timing 0 to the register 42, the 3 merging bits of this register 42 and the 14 bits of the data signal of the register 13 are combined to produce a 17-bit signal which is then supplied to a shift register 43 for parallel/serial conversion. The contents of the shift register 43 are read out in accordance with the system clock signals Sc and the sync pattern is restored in an exclusive OR circuit 44 so as to be outputted at an output terminal 46 via a flip flop 45.

In the present embodiment, the registers 29 and 30 for maintaining the cumulative DSV and polarity are reset by a block sync signal Sb supplied to the system control circuit 15 at an interval of 98 frames or one sub-block to control the DSV independently at each sub-block as one unit to form a record data in which the merging bits of the bit pattern according to the value of this DSV are inserted between the above n-bit data, where n=14. Since the DSV is controlled independently for each sub-block, the above record data can be controlled individually and recorded and/or reproduced as block data having one sub-block per sector.

Figure 6:
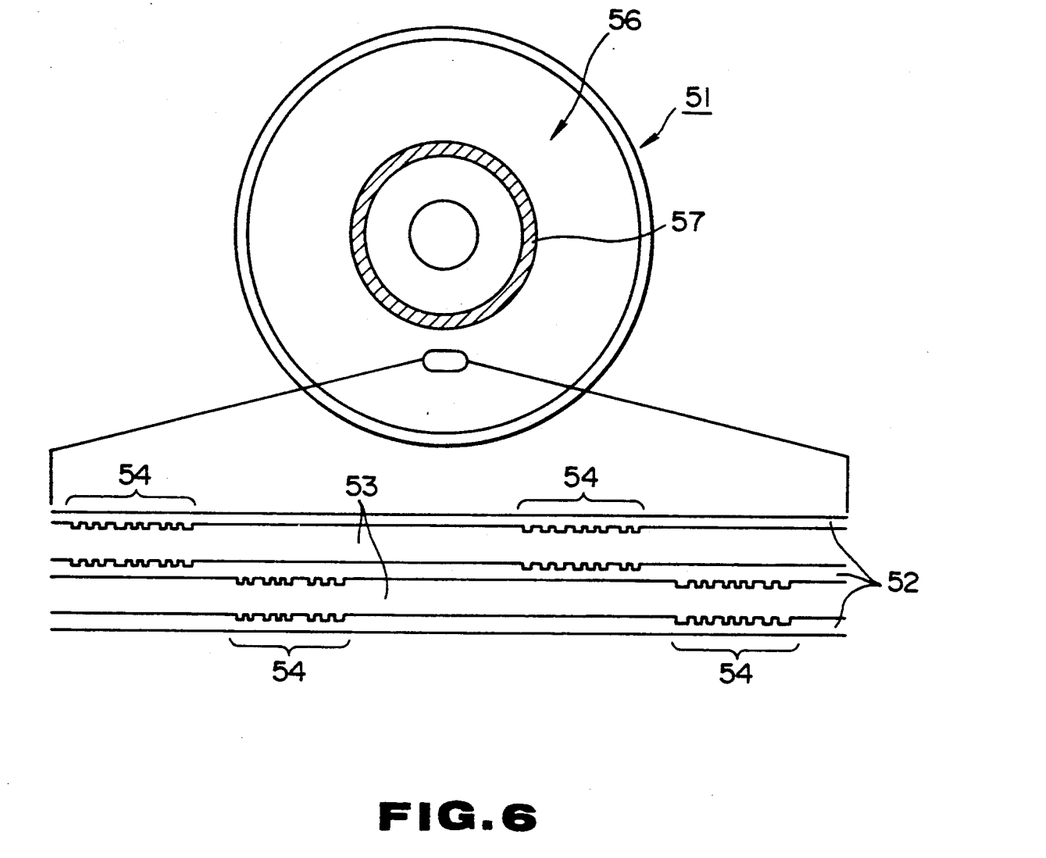
FIG. 6 is a diagrammatic plan view of an optical disc used in the recording/reproducing apparatus shown in FIG. 3.

The data block of one sub-block or sector thus obtained is recorded in an optical disc 51 shown for example in FIG. 6.

Figure 7:
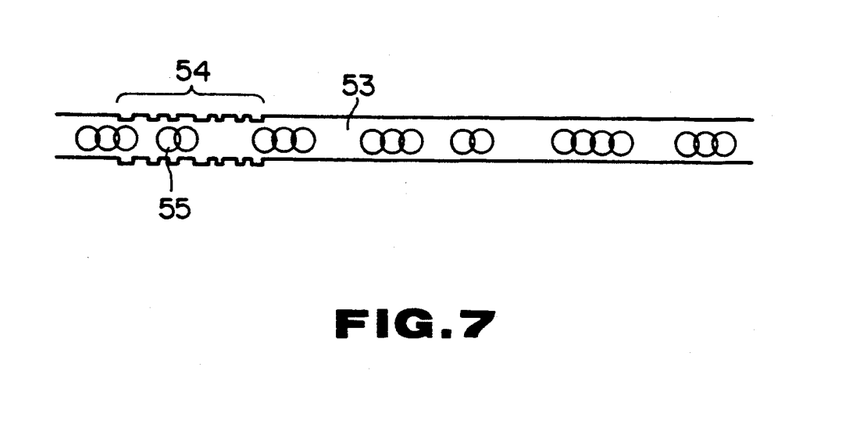
FIG. 7 is a diagrammatic view showing the data recording state on the recording track of the optical disc.

In the present embodiment, the optical disc 51 as the recording medium is a magneto-optical disc formed of a transparent base plate with a perpendicularly magnetized film having magneto-optical properties. A block of data containing 2 K bytes, obtained in the demodulating circuit shown in FIG. 3 in accordance with the CD-ROM data format, is photomagnetically recorded as shown in FIG. 7 on a recording track 53 formed by a land between spirally extending pregrooves 52, as shown in FIG. 6.

In the recording track 53, there are formed address regions 54 at predetermined equal intervals along the length of the track and at the portion registering with the sync portions SYNC or error correction signal ECC portions in the above described CD-ROM data format. These address regions are formed by burst-like changes of the track width such that 19-bit address data, for example, are pre-recorded in each address region 54 by these changes of the track width.

On the radially inner side of the data region 6 of the disc 51, where data are recorded, there is formed a lead-in region 57, in which there are recorded lead-in data indicating the recording state of the data region 56.

Figure 8:
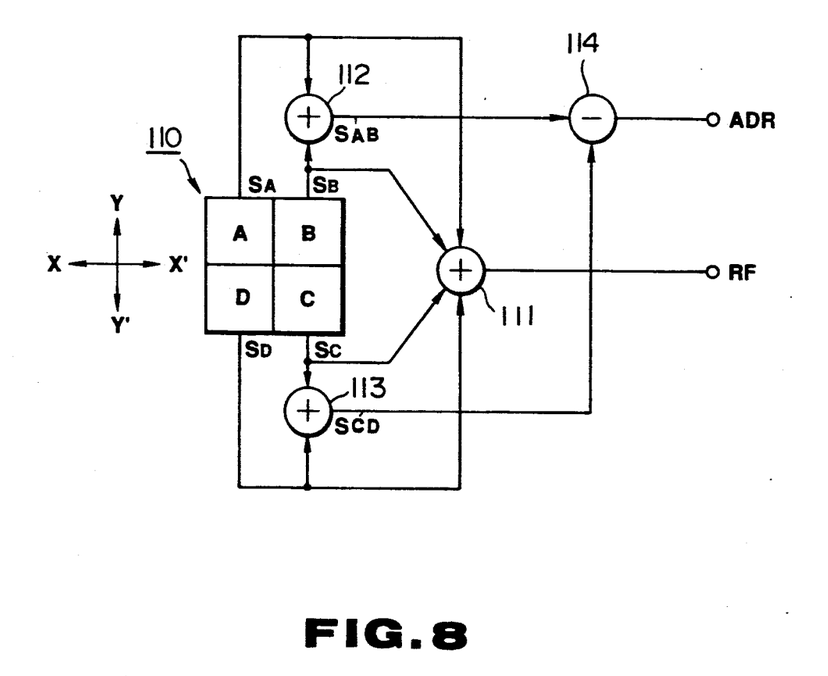
FIG. 8 is a block diagram showing the optical pickup for reading out data from the optical disc depicted in FIG. 6.

In the optical disc 51 of the present first embodiment the recording track 53 has equally spaced address regions 54 in each of which there are recorded address data of a predetermined bit number by the changes along the track width. A four segment detector 110 composed of four detectors A, B, C and D, as shown for example in FIG. 8, is used as a data read-out optical pickup. Thus, a data signal RF can be detected in the form of a summation output signal $S_A+S_B+S_C+S_D$ obtained by summing the outputs $S_A$, $S_B$, $S_C$, and $S_D$ of the respective detector A, B, C and D at an adder 111.

On the other hand, an address information signal ADR can be detected in the form of a subtraction output signal equal to $(S_A+S_B)-(S_C+S_D)$ obtained by subtracting in a subtractor 114 a summation output $(S_C+S_D)$ of the outputs $S_C$ and $S_D$ of the detectors C and D produced by an adder 113 from a summation output $(S_A+S_B)$ produced by an adder 112 of the outputs $S_A$ and $S_B$ of the detectors A and B, wherein the detectors A, B and C, D are arranged in the longitudinal or X—X' direction of the recording track 3, that is, in the form of push-pull outputs $S_A - S_D$ and $S_B - S_C$, and the detectors A, D and B, C are arranged in the widthwise direction or Y—Y' direction of the recording track 53.

In this optical disc 51, the record data in which DSV is controlled independently for each sub-block as one unit is controlled individually as the block data having the above sub-block as one sector to record and/or reproduce the record data.

In the recording/reproducing method of the present invention, the merging bits of the bit pattern in accordance with the value of the record data are inserted between the above n-bit data, while the value of the above DSV is reset for each predetermined data block, so that the DSV of the recording data can be controlled individually for each data block and the record data can be written or rewritten for each data block as one unit. Moreover, in the recording medium of the present invention, since the DSV of the recording data is controlled individually for each data block as one unit, writing or rewriting the record data for each data block as one unit does not affect the contents of the recording data of the other data blocks. Thus, in accordance with the present invention, when data are recorded with a modulation in which the m-bit data is converted into n-bit data, where m and n are real integers and m<n, and p-bit merging bits are inserted into these n-bit data so that the number of consecutive "0" bits in the alternate series of n-bit data and p-bit merging bits is more than a predetermined number d and less than a number k which is larger than d, data can be written or re-written on a block-by-block basis, so that block-by-block data control can be performed efficiently. On the other hand, in the data recording medium on which the above data are recorded, such as CD-WO or CD-RAM, data writing or re-writing can be made on a block-by-block basis, while data control can be performed efficiently on a block-by-block basis.

Figure 9:
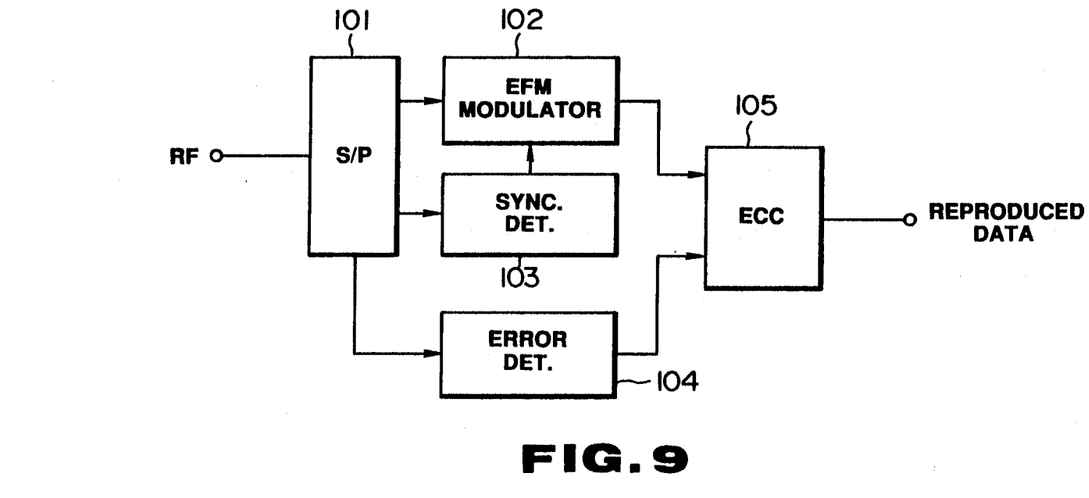
FIG. 9 is a block diagram showing the essential portions of the reproducing system according to the invention.

The reproduced data signals RF obtained at the aforementioned optical pickup from the recording track 53 of the optical disc 51 are supplied via edge detection circuitry, not shown, to a reproducing system shown in FIG. 9.

In the block diagram of FIG. 9 showing essential portions of the reproducing system of the present embodiment, the reproduced data signals RF are supplied from an input terminal via serial/parallel (S/P) converter 101 to an EFM demodulator 102, sync detector 103 and an error detector 104.

Based on the sync signals SYNC detected at the sync detector 103, the EFM demodulator 102 demodulates the 14-bit data converted into parallel data at the SP converter 101 into the original 8-bit data and transmits the demodulated output data to the error correction unit 105. This EFM demodulator 102 demodulates the original data into the 8-bit data, to the disregard of the merging bits, as in the conventional manner.

Figure 10A:
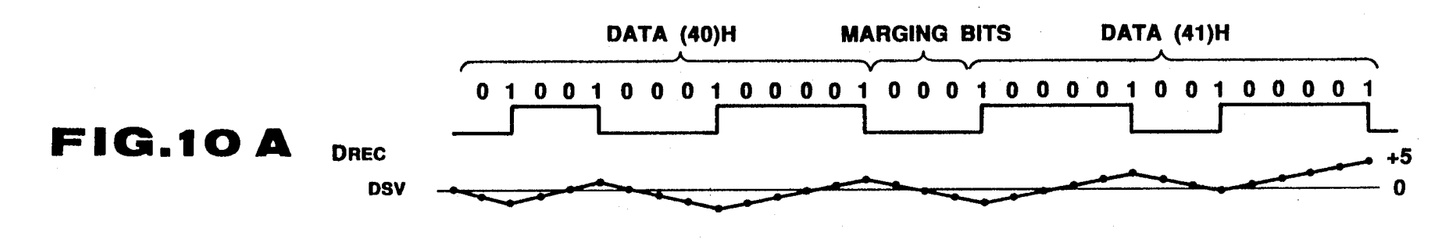
FIGS. 10A, 10B and 10C are diagrammatic views for illustrating examples of demodulating and reproducing errors caused by the read-out errors in a CD reproducing system.
Figure 10B:
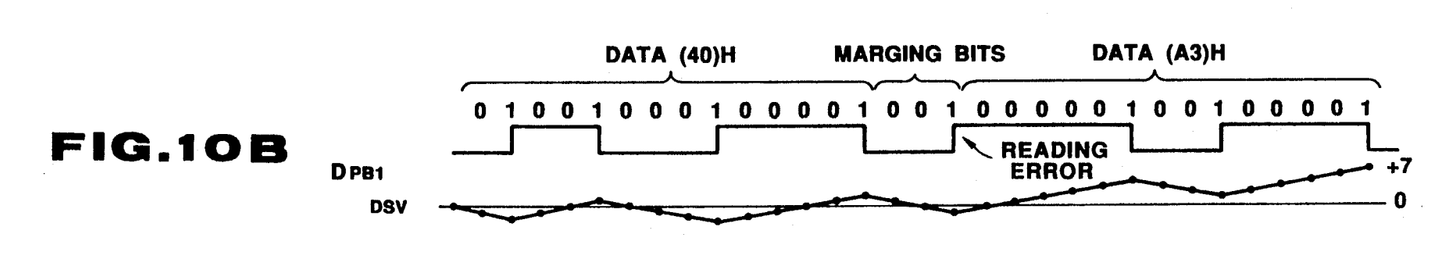
Figure 10C:
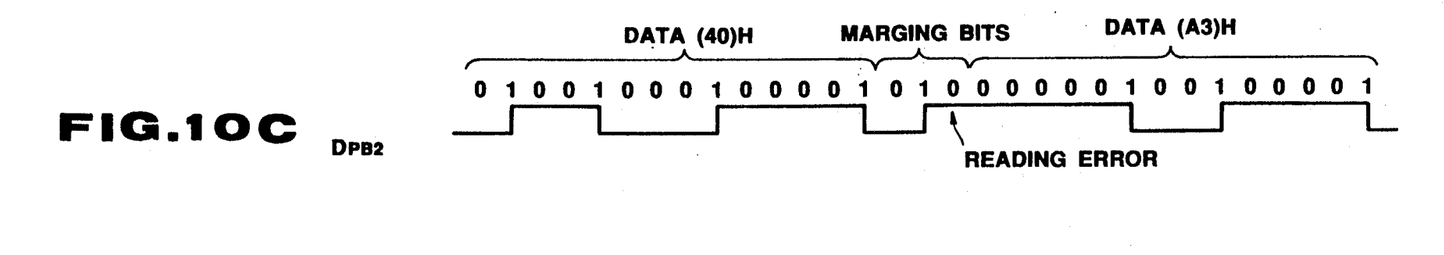

However, in the CD data format, the three merging bits are provided between the symbols as mentioned hereinabove to control the DSV of the record data as well as to procure the minimum transition interval $T_{min}$ and the maximum transition interval $T_{max}$ in the modulation rule of the record data in which the number of consecutive "0" bits is not less than 2 and not more than 10. However, in the CD reproducing system, only the intrinsic data were demodulated and reproduced, to the disregard of the contents of the above merging bits. Thus, when the record data DREC produced by EFM modulation of a data (4041)H (FIG. 10A), where        data $(40)_H$  merging bits  data $(41)_H$ $D_{REC}$: 01001000100001  0 0 0  10000100100001, are erroneously read at the connecting portion between the merging bit and the data $(41)_H$ such that the reproduced data $D_{PB1}$, where        data $(40)_H$  merging bits  data $(A3)_H$ $D_{PB1}$: 01001000100001  0 0 1  00000100100001, as shown in FIG. 10B or the reproduced data $D_{PB2}$, where        data $(40)_H$  merging bits  data $(A3)_H$ $D_{PB2}$: 01001000100001  0 1 0  00000100100001, as shown in FIG. 10C are produced, an erroneous result of demodulation and reproduction $(40A3)_H$ is given for both reproduced data $D_{PB1}$ and $D_{PB2}$.

Thus the error detector 104 is provided in the present embodiment to prevent the above erroneous result of demodulation and reproduction from being produced.

Figure 11:
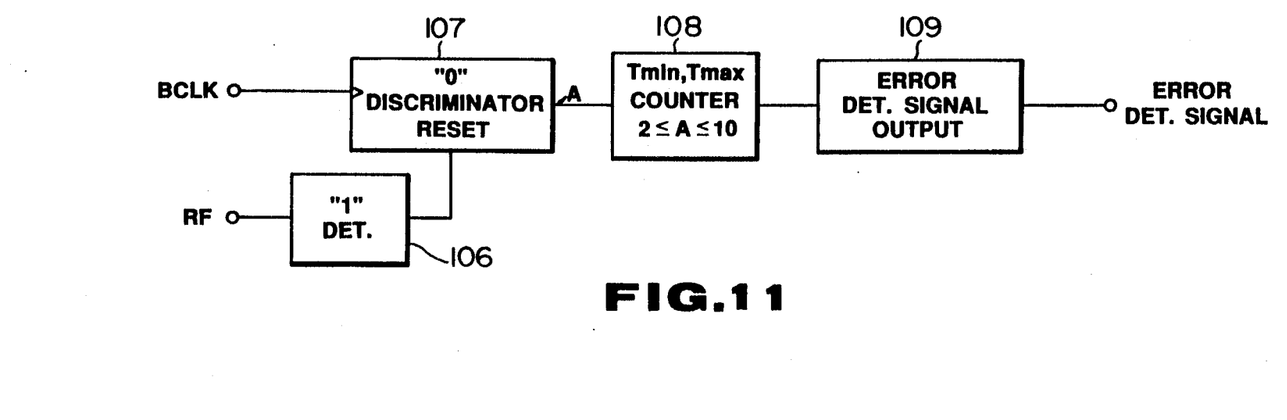
FIG. 11 is a block diagram showing constructional examples of the error detection section constituting the reproducing system according to the invention.

As shown for example in FIG. 11, the error detector 104 is composed of a "1" detector 106 for detecting the data "1" in the reproduced data signal RF supplied via SP converter 101, a "0" counter 107 reset each time the detector 106 detects the data "1" to count the bit clock BCLK of the reproduced data signal RF, a decision block 108, in the form of a $T_{min}$, $T_{max}$ counter, for deciding if the count output value A from the "0" counter 107 is not less than 2 and not more than 10, and an error detector signal output unit 109 connected to the decision block 108 for outputting an error detection signal when the count output value A from the "0" counter 107 is not less than 2 and not more than 10. The bit clock BCLK is generated from the reproduced signal by circuitry not shown in FIG. 11.

The "0" counter 107 is reset each time the detector 106 detects the data "1" to count the bit clocks BCLK of the reproduced data- signal RF so that the number of the data "0" in the reproduced data signal RF can be counted. When the count output value A by the "0" counter 107, that is, the number of the data "0" in the reproduced data signal RF, is not less than 2 and not more than 10, that is, when the reproduced data signal RF does not hold the minimum transition interval $T_{min}$ or the maximum transition interval $T_{max}$, the decision block 108 causes an error detection signal to be outputted via output section 109.

The error detection signal produced at the error detector 104 is supplied to the ECC processor 105 along with the demodulated output data from the EFM demodulator 102. The error detector 104 performs the above described error detection for the totality of the bits of the reproduced signal RF inclusive of the merging bits to form an error detection signal which deems that the demodulated output data from EFM demodulator 102 seems to include an error.

The error detection signal obtained at the error detection section 104 and the demodulation output data from the EFM demodulator 102 are supplied to an ECC processor 105 where the error status in the vicinity of the demodulated output data indicated by the error detection signal is analyzed and a proper error correction is performed before outputting the error corrected demodulated reproduced data.

In the above described error detector 104, the error detection is performed by deciding whether or not the reproduced data signal RF holds the minimum transition interval $T_{min}$ or the maximum transition interval $T_{max}$ in the modulation rule of the CD data format, depending on whether or not the number of the data "0" is not less than 2 and not more than 10, for the totality of the bits of the reproduced data signal RF, inclusive of the merging bits. However, the read-out error of the merging bits per se can also be detected by supplying the demodulated output data from the EFM demodulator 102 to the modulating circuitry of the recording system as the data signal Sd and comparing the three merging bits from the register 42 of the modulating circuit with the three merging bits contained in the reproduced data signals RF in a data comparator, not shown, to detect the non-coincidence between these merging bits. In this case, the error detection signals which deem the demodulated output data in the vicinity of the merging bits not consistent with the modulation rule as being in error are supplied to the ECC processor 105 along with the demodulated output data, in such a manner that the demodulated output data are subjected at the ECC processor 105 to the error correction processing which also takes advantage of the merging bits, with the result that highly reliable demodulated reproduced data can be obtained.

In the optical disc 51 of the present embodiment, there are recorded recording data in which DSV control is performed separately on the basis of the sub-block as a unit, so that each sub-block can be individually controlled on the basis of each sub-block as one-sector block data to effect the above operation of error correction while the data can be recorded and/or reproduced on the basis of each one-sector block data.

Although the present invention has been shown and described with respect to preferred embodiments, various changes and modifications which are obvious to a person skilled in the art to which the invention pertains are deemed to lie within the spirit and scope of the invention.

What is claimed is:

1. A method for modulating data to be recorded, including the steps of:
   (a) converting m-bit subsets of the data into n-bit data streams, where m and n are real integers and m<n, and
   (b) producing data blocks, wherein each of the data blocks comprises a sync bit pattern and an alternating concatenation of p-bit merging bits and n-bit data streams, wherein the step of producing the data blocks includes the steps of inserting p-bit merging bits between consecutive ones of the n-bit data streams, and generating the p-bit merging bits independently for each of the data blocks so that the number of consecutive "0"s in each of the data blocks is not less than a predetermined number d and not more than a number k which is larger than d, whereby each of the data blocks is independently rewritable with its own set of consistent merging bits.

2. A method as recited in claim 1, wherein step (b) comprises the step of generating each said set of p-bit merging bits so that each said set of p-bit merging bits has a bit pattern consistent with a digital sum value generated for the relevant one of the data blocks, to enable each of the data blocks to be independently rewritten as a unit.

3. A method for reproducing recorded data from a recording medium, wherein the recorded data have been modulated prior to being recorded on the recording medium in accordance with a modulating process, wherein the modulating process includes the steps of converting m-bit subsets of the data into n-bit data streams, where m and n are real integers and m<n, inserting a set of p-bit merging bits between each pair of consecutive n-bit data streams, and generating the p-bit merging bits so that the number of consecutive "0"s in the resulting sequence of alternating n-bit data streams and p-bit merging bits is not less than a predetermined number d and not more than a number k which is larger than d, said method comprising the steps of:
   (a) reproducing the recorded data, thereby generating reproduced data;
   (b) during step (a), deciding whether the reproduced data has a bit pattern consistent with the modulation process, wherein the reproduced data has a bit pattern consistent with the modulation process when number of consecutive "0"s in reproduced data is not less than the number d and not greater than the number k; and
   (c) outputting error detection data along with the reproduced data, wherein the error detection data indicates whether or not the reproduced data is consistent with the modulation process.

4. In combination, a data recording apparatus and a data recording medium having recorded data thereon, wherein the recorded data have been modulated in such a manner that m-bit subsets of the data have been converted into n-bit data streams, where m and n are real integers and m<n, and the recorded data have been organized into data blocks, wherein each of the data blocks comprises a sync bit pattern and an alternating concatenation of p-bit merging bits with said n-bit data streams, wherein the p-bit merging bits have been generated independently for each of the data blocks so that the number of consecutive "0"s in each of the data blocks is not less than a predetermined number d and not more than a number k which is larger than d, and wherein the merging bits for each of the data blocks have a bit pattern consistent with a digital sum value generated independently for said each of the data blocks, to enable each of the data blocks to be independently rewritten as a unit.

5. The method of claim 2, wherein the number m is equal to 8 and the number n is equal to 14.

6. The method of claim 5, wherein the number d is equal to 2 and the number k is equal to 10.

7. The method of claim 6, wherein the number p is equal to 3.

8. The method of claim 3, wherein the number m is equal to 8 and the number n is equal to 14.

9. The method of claim 8, wherein the number d is equal to 2 and the number k is equal to 10.

10. The method of claim 9, wherein the number p is equal to 3.

11. The combination of claim 4, wherein the number m is equal to 8 and the number n is equal to 14.

12. The combination of claim 11, wherein the number d is equal to 2 and the number k is equal to 10.

13. The combination of claim 12, wherein the number P is equal to 3.

* * * * *